United States Patent Office 3,086,239
Patented Apr. 23, 1963

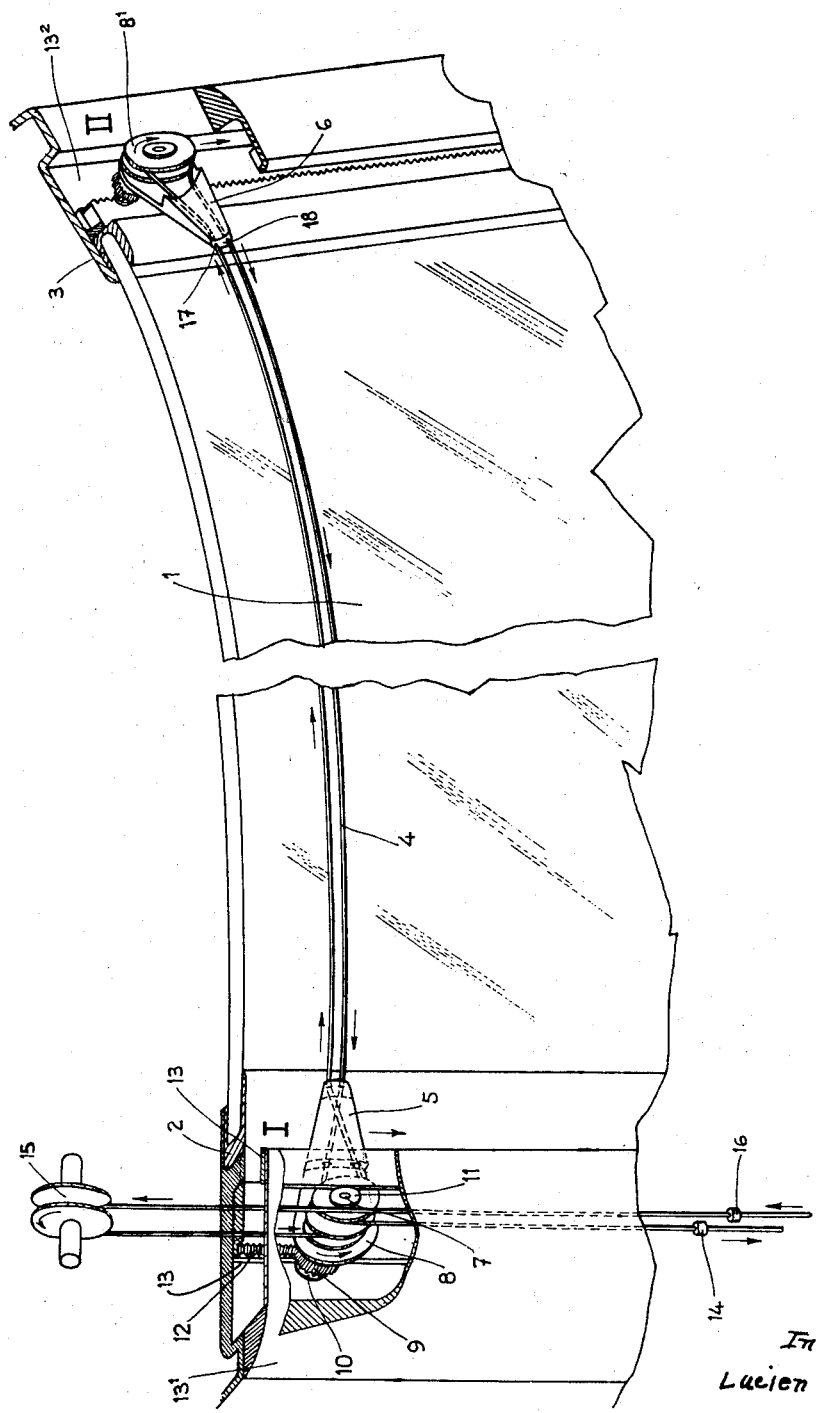

3,086,239
WINDSCREEN WIPERS
Lucien Péras, Billancourt, France, assignor to Regie Nationale des Usines Renault, Billancourt, France
Filed Dec. 23, 1960, Ser. No. 78,046
Claims priority, application France Dec. 30, 1959
3 Claims. (Cl. 15—250.29)

This invention relates in general to windscreen wipers and more particularly to improvements in apparatus mounted on the windscreens of automobile vehicles for wiping convex or panoramic glass panels.

Windscreens of the types now in general use have many drawbacks:

(1) They clean only one fraction of the glass surface, and this is obviously dangerous.

(2) The wipers themselves represent a considerable surface, they are opaque and travel in a non-accommodated zone of the vision, which is tiresome for the eyes.

(3) When inoperative they occupy an unpleasant and inconvenient position.

(4) Their mechanisms are not very advanced technically and mostly a source of noise, and their efficiency is relatively poor.

The improvements constituting the subject-matter of this invention permit of avoiding these inconveniences and consist essentially in mounting on the windscreen a strong wire stretched between the side posts of this windscreen and so driven as to perform a movement of translation in a direction parallel to the wire from top to bottom of the windscreen and vice-versa, while receiving a sliding movement along its axis. The combination of these two simultaneous movements is necessary to obtain a smooth operation and avoid chattering, and on the other hand the sliding displacement along the wire axis plays a prominent part in the removal of the impurities adhering on the glass surface.

The single FIGURE of the attached drawing illustrates diagrammatically by way of example a windscreen wiper constructed according to the teachings of this invention.

In the drawing, it will be seen that the windscreen glass panel 1 is mounted between a pair of side posts 2, 3.

The wire 4 constitutes the wiping device proper contacting the glass panel 1.

This wire 4 passes over pulleys and guide members properly disposed in trolley-like, vertically-sliding, spindle-shaped oscillating supports 5, 6 disposed on either side of the glass panel, and also over a return pulley, as will be explained presently.

The left-hand driving trolley 5 carries a shaft 7 trunnioned in this support and having keyed thereon:

(a) a twin-grooved rubber pulley 8 of relatively high Shore hardness number;

(b) a pinion 9 of suitable plastic material or plastic-impregnated fabric;

(c) a pair of rollers 10 and 11 machined to the pitch circle of pinion 9.

The means guiding the vertical displacement of the spindle-shaped support comprises:

A vertical rack 12 of brass or steel protected against oxidation and in meshing engagement with pinion 9.

A pair of steel strips 13 having a rail-forming edge co-planar with the pitch line of the track in a direction parallel to the rack teeth, said rollers 10 and 11 rolling between these two steel strips.

The members 12 and 13 of each trolley are carried by hollow bars or posts $13^1$, $13^2$ fitting on the lateral posts of the windscreen.

The receiver trolley 6 has the same component elements as the driving trolley 5, but the pulley 8' has only one groove.

The wire 4 issuing from the body of the vehicle through a sealing cord-eye 14 follows the path indicated by the arrows in the drawing. It passes over one groove of the twin pulley 8, then crosses the windscreen and passes over the return single-grooved pulley 8' of the receiver trolley, then back to the driving trolley along the windscreen, over the second groove of pulley 8, rises to the upper return pulley 15 located at a suitable upper position in the body, then down to reenter the body through another sealing cord-eye 16.

As the wire is pulled in the direction of the arrow adjacent 14, the tensions are distributed throughout the system, the wire moving at all points as indicated by the arrows. The trolleys are pulled toward the centre of the windscreen, the rollers bearing against the guide strips 13, and pinion 9 meshing to the proper depth with rack 12. To prevent the pinion from disengaging itself from the rack, the oscillating supports or trolleys bear with their rear circular portion against the bottom of the hollow bars or posts $13^1$, $13^2$, as shown notably in the right-hand post $13^2$.

The oscillating supports 5, 6 carry wire guides 17, 18 on their registering or adjacent ends. The wire guide of trolley 5 is adapted to cross the two spans of the wire by changing their planes in order to direct the wire toward the proper pulley grooves.

These supports are directed in a frictionless manner within the bar or post according to the resultant of the tractive efforts applied thereto. The mechanical efficiency may be relatively good, since it involves only rolling motion without any frictional contact along guide planes, this type of contact being reduced to a minimum by the alignment.

The operation of this device will be readily understood. An electrical or mechanical winch (not described herein as it is no part of this invention) receives the wire span issuing through the cord-eye 16, the other wire span below 14 being tensioned by a spring. The wire slides on the glass surface, one span in each direction, and the assembly descends to the bottom of the windscreen (in the direction of the arrows in the figure). The wiping action results from the frictional and shearing effect. The upward movement to the top of the windscreen is obtained by reversing automatically the direction of travel of the wire spans within the winch.

In connection with the device of this invention, it may be noted that:

The tractive effort exerted on the incoming wire span at the winch is directed in the direction of motion of the driving trolley;

If the two wipers are not parallel, as will generally occur, the receiver pulley will rotate less than the driving pulley for the same travel accomplished. The pitch diameter of the pinion carried by the receiver trolley is greater than that of the driving trolley;

It is not necessary to protect the interior of the rail-forming steel strips against the ingress of rainwater. The rotary members are protected by the flanges of the rubber pulleys acting as rotary or shaft packings. The steel strips and racks are treated against corrosion and oxidation. A rain-strap for discharging rainwater is provided at the bottom of the bars or posts $13^1$, $13^2$;

The travelling wires are guided by pulleys except in the wire guides where a frictional sliding contact takes place. If it is deemed that wear would develop too fast at these points special trackways may be provided there.

The winch pulls the wire at the rate of about 500 millimeters or 19.7" per stroke. The reduction ratio to be provided after the driving electromotor is smaller than in the case of a conventional windscreen wiper requiring a relatively high torque on the shafts carrying the wiper blades.

The glass cleaning member consists of a wire or thread having a good mechanical resistance, such as nylon, special rayon, etc., of moderate gauge, for example of the order of 1 millimeter, tensioned between the two lateral posts of the windscreen.

In the drawing, it is assumed that the wire guiding strips are housed within the body of the vehicle, but this example should not be construed as limiting the invention. The side posts and trolleys have been shown with a considerable magnification in order to afford a better understanding of the construction.

This windscreen wiper is characterized by the following advantages:

Nearly 100 percent of the windscreen surface is wiped.

The thin, translucent wires will not interfere with the vision.

The operation is particularly noiseless.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. For use with a vehicle windshield, particularly of the curved, convex type, which includes lateral posts at the ends of the windshield, a windshield wiper comprising a wire of relatively small diameter extending transversely across the outer surface of the windshield between the lateral posts, a pair of left-hand and right-hand wire supports disposed adjacent the lateral posts, pulleys carried by the supports and guiding the wire and permitting the wire to move to and fro in the transverse direction of the windshield and substantially vertical guide members disposed adjacent the posts, said supports being displaced vertically by the wire tension in the guide members so that the wire performs a movement of translation in a direction parallel to itself from top to bottom and bottom to top of the windshield.

2. Windshield wiper according to claim 1, wherein each one of the left-hand and right-hand wire supports comprises wire guides and a shaft carrying a pulley, a pinion in constant meshing engagement with a substantially vertical rack and guide rollers engaging vertical rail-forming strips, one of said supports constituting the driving support and the other the receiver support which, by means of its pulley, reverses the direction of travel of the wire so that the windshield is wiped by two spans of the wire wound on a driving winch by reversing automatically the function of the wire spans in the winch at the end of each vertical movement of the wire.

3. Windshield wiper according to claim 2, wherein the vertical supports for the wires and the members associated therewith such as the pinion, rack and guide rollers, are housed in hollow bars disposed on either side of the windshield lateral posts.

References Cited in the file of this patent

UNITED STATES PATENTS 2,896,245    Hopponen  --------------  July 28, 1959